May 29, 1962 G. T. BARRETT ETAL 3,037,189
VISUAL DISPLAY SYSTEM
Filed April 23, 1958 4 Sheets-Sheet 1

INVENTORS.
GEORGE T. BARRETT
and MAURICE I. CRYSTAL
BY F. R. Sullivan
ATTORNEY.

May 29, 1962 G. T. BARRETT ETAL 3,037,189
VISUAL DISPLAY SYSTEM
Filed April 23, 1958 4 Sheets-Sheet 2

INVENTORS.
GEORGE T. BARRETT
and MAURICE I. CRYSTAL
BY F. L. Sullivan
ATTORNEY.

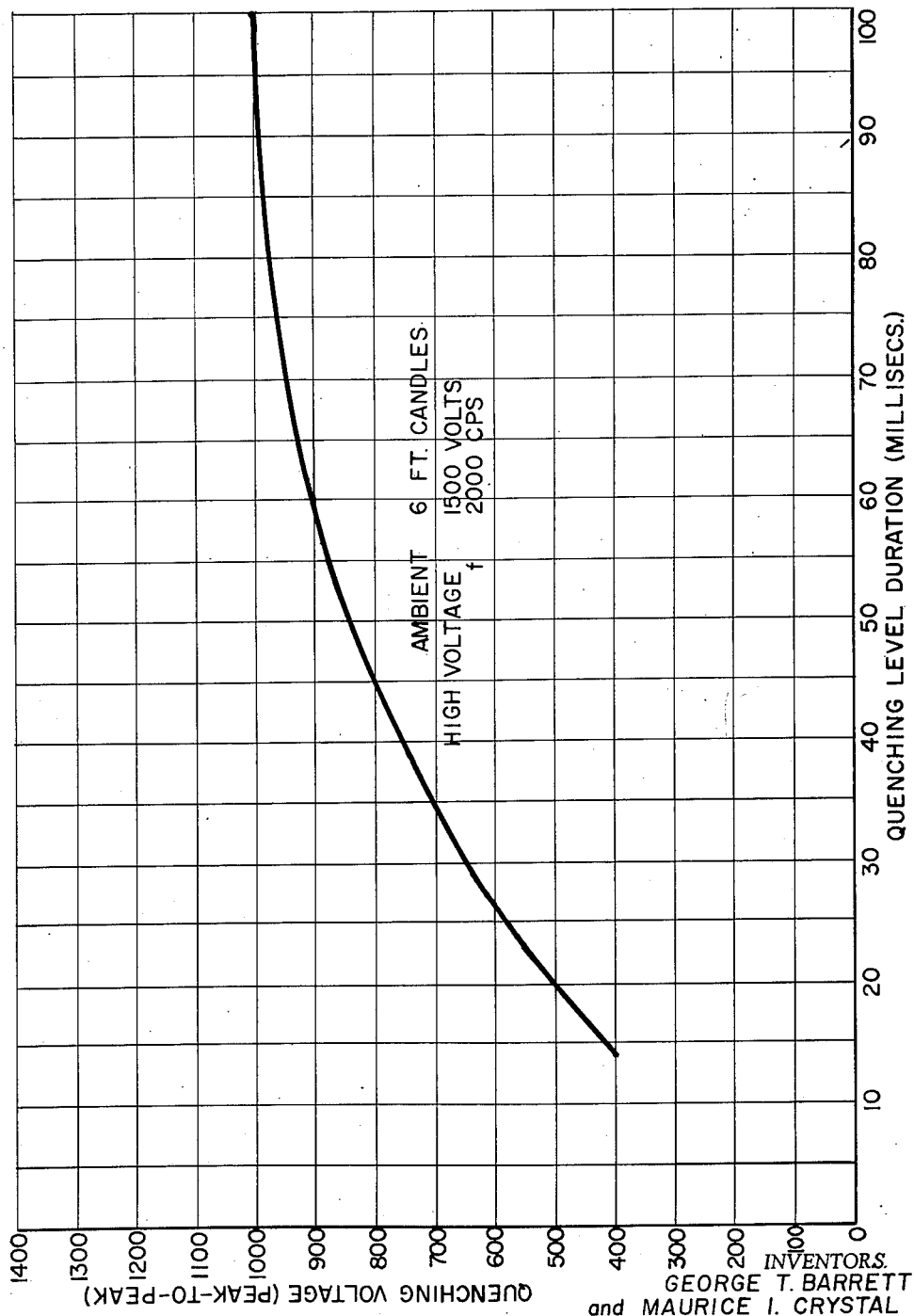

"""
3,037,189
VISUAL DISPLAY SYSTEM
George T. Barrett, Woburn, and Maurice I. Crystal, Brookline, Mass., assignors, by mesne assignments, to Sylvania Electric Products, Inc., Wilmington, Del., a corporation of Delaware
Filed Apr. 23, 1958, Ser. No. 730,428
8 Claims. (Cl. 340—166)

This invention is concerned with visual display systems, and particularly with display panels upon which images are formed by selective illumination of independent visual elements or cells.

Such panels are useful for presenting selectively variable patterns of information in a two dimensional raster; and, have many varied applications such at totalizer boards at marketing centers, animated advertising and information displays, pictorial reproductions and presentations, etc.

At present, the two principal types of such display devices in general use are matrix arrangements of selectively operable light bulbs and various forms of cathode ray tube presentations, viewed either directly or projected onto image screens.

The light bulb displays have been satisfactory for relatively large panels and in applications where compromises can be tolerated with the exact geometry of the ideal image. They are, however, severely limited in resolution capability because of the necessary size of the individual bulbs which comprise their constituent visual elements. The cathode ray tube devices have satisfactory powers of resolution and can provide accurate geometric reproductions, but their size is definitely limited and they have the inherent encumbrance of the excessive third dimensional depth of gun structure, etc. required to provide only a two dimensional image.

Neither of these two general types of device have satisfied the long felt need for a flat screen, selectively patternable, visual display panel with high resolution qualtity and a size potential ranging from television screen to wall plotting board dimensions.

In an article entitled The Sylvatron: A New Application of Electroluminescence, Sylvania Technologist, October 1957, Keith H. Butler and Frederic Koury describe display panels utilizing electroluminescent phosphors as image producing devices. Two of the panels described in this article and the references cited therein have a potentiality for image display with desirable resolution, overall size, and selective control.

One of these devices, developed by Sylvania Electric Products Inc. and called by them the "Mobile Dot Sylvatron," features a lamination of light transparent, electrically conductive, strips laid down upon the front and rear surfaces of a layer of electroluminescent phosphor material. The front strips are substantially parallel with each other to form rows of X-coordinate conductors; and, the rear strips are also mutually parallel in Y-coordinate columns disposed substantially perpendicular to the front conductors. When the proper voltage is applied between a pair of X and Y conductors, the phosphor at their intersection illuminates; and, by selectively controlling the application of voltage to the various coordinates images may be produced and varied.

This panel is capable of generating a mobile display of selected spots or blocks of light and is very useful for some purposes. Due to the fact, however, that there is a capacitative effect along the selectively activated conductors, all of the cells along each row show a slight amount of low brilliance "cross talk" illumination when a cell at the intersection of the activated coordinate conductors is fully illuminated. This can be troublesome and sometimes requires additional corrective circuitry. Also, with this type of panel a cell is illuminated, except for a given decay time, only as long as voltage is applied across it. Consequently, an image of any significant complexity can be sustained or altered only by scanning the entire display, element by element, at a rate faster than the persistency of vision. This imposes extreme switching problems which are further complicated by the relatively high voltages involved and limit the size and resolution of the display.

The second device described in the article referred to above is called Sylvania's "Mosaic Sylvatron." These mosaic panels are formed by depositing a light transparent, electrically conductive film on a glass substrate, placing an electroluminescent phosphor layer upon the conductive film and covering this layer with an arrangement of individual cells. Each cell is comprised of a glass column having light transparent, electrically conductive caps at their front and back ends. The front caps rest against the electroluminescent layer and the back caps are in contact with an electrically conductive metal mesh. A photoconductive material is deposited around the sides of the glass columns in electrical contact with the front and rear caps and in optical contact with the glass in the area between these caps.

In a dark condition, if voltage is applied between the conductive film on the glass substrate side of the electroluminescent layer and the metal mesh, there will be no illumination of the electroluminescent material because, although the rear caps are in contact with the activated mesh and the front caps are capacitatively coupled to the activated conductive layer on the opposite side of the electroluminescent material, the photoconductor connecting the front and rear caps, being in a dark state, offers maximum resistance to electrical conduction.

When, however, light from an external source is applied to any one of the cells, its associated photoconductor changes from a high resistance to a low resistance electrical path and the voltage at the rear mesh is consequently applied with very little drop to the front cap and thence across the area of electroluminescent layer immediately in front of it. The effect is to illuminate this particular spot of electroluminescent material. The illumination is not only reflected from the face of the screen but is also diffused, in a feed-back operation, through the glass column of the cell to sustain the photoconductive material immediately surrounding the glass column in a low resistance condition and the cell in illumination. A cell so activated will remain in an illuminated condition until the applied voltage is removed; and a complex image may be produced by selectively illuminating a desired pattern of cells.

This mosaic panel has the very distinct advantage of bi-stability; i.e., each cell is either illuminated or extinguished without troublesome semi-illumination, and individual cells may be selectively illuminated to produce images in complex patterns. Selective erasure, however, is not possible. Also, the problem of providing a light source capable of activating a single cell at a time in the mosaic structure is considerable. The light source must be selectively confinable to the area of a single cell, and comprise either a single source movable to register with each cell in the panel or a complete array of independently actuable light sources one for each cell in the complete structure. The most practicable proposal has been to provide a mobile dot panel in close proximity to the mosaic panel. The result, however, is an exceedingly complex structure with manufacturing problems such as exact registration of corresponding cells in the two panels, elaborate switching networks, uniformity of light strength, and cell response, etc.

The principal objective of the present invention is to provide an improved type of visual display system and, in particular one which will make possible relatively large, and flat, display screens with high image resolution and maximum patterning versatility. Another objective is to provide an improved electroluminescent display panel and improved means for selectively operating discrete visual elements in such panels.

The present inventors have accomplished these objectives with an electroluminescent display system which incorporates all the advantages, including visual element bi-stability, of the electroluminescent-photoconductive mosaic panel referred to above and also provides the outstanding further advantage of selective illumination and erasure of any desired cell or patterned combination of cells without disturbing the illuminated or extinguished condition of the remaining cells. This feature, which has not hitherto been practicable, finally provides the relatively flat, high resolution, and selectively variable pattern display which has been so long desired.

One of the features of the invention is the use of a voltage trigger instead of a light impulse to activate an electroluminescent-photoconductive mosaic cell of the type previously described. This approach to the problem utilizes the photoconductive material in series with the electroluminescent phosphor as a voltage divider arrangement. By increasing the voltage across the divider until the proprotional drop across the electroluminescent material itself is sufficient to illuminate the phosphor, a cell is actuated; and once its electroluminescent phosphor starts to emit light, the feed-back of illumination reduces the voltage drop across the photoconductive portion of the divider, thereby enhancing the triggering action.

In order to make selective triggering of individual cells possible, the display panel of the present system has been modified from that previously described in that the single light transparent conductor in front of the electroluminescent material covering all of the cells has been divided into a plurality of separate conductive strips connecting the cells along each X-coordinate row, and the single wire mesh covering all of the cells at the rear of the panel has been divided into a number of separate conductors connecting the cells down each Y-coordinate column of the matrix. This permits each cell, or groups of cells, to be selectively excited or extinguished by appropriate pulsing of the proper coordinates.

In addition to providing for voltage as distinguished from light excitation of the individual cells and a new mosaic structure, the present inventors have discovered and taken advantage of the fact that electroluminescent material can be held in either an illuminated or an extinguished condition by voltage of a given intermediate amplitude and illuminated cells can be erased by dropping this voltage by a critical amount, just as extinguished cells can be illuminated by raising the applied voltage from hold to trigger amplitude. They have further observed and utilized the properties that the triggering and erasure capabilities are functions of signal pulse duration as well as amplitude. Consequently, although additional cells along the X and Y coordinates of a particular cell being illuminated or extinguished in this display system may be subjected to voltage disturbances in the direction of illumination or erasure, these disturbed cells will not trigger, however, because the duration of the pulses introduced into the system to accomplish changes of state is limited to the critical time period for accomplishing transition only at maximum voltage increase or decrease.

The function of determining whether a hold, a trigger, or an erase operation is to be performed is abetted by a special switch in each of the X and Y coordinate drive lines which utilizes saturation of a transistor across a transformer to provide a variable impedance in each drive line. This impedance may be changed selectively to introduce desired variations into the drive voltage.

Other features and objectives of the invention will be apparent from the following description of one of its embodiments and reference to the accompanying drawings, wherein:

FIG. 8 is a plot of quenching or extinguish voltage pulse amplitude vs. width for the same panel.

Figure 1:
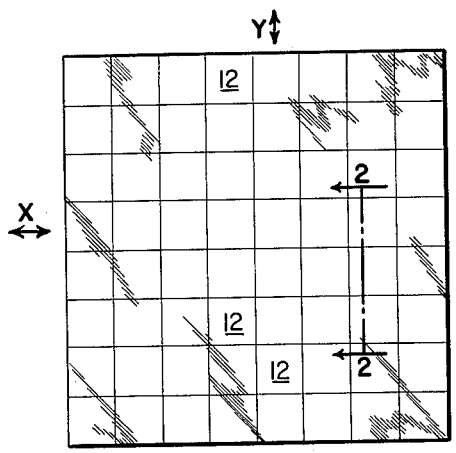
FIG. 1 is a diagrammatic representation of the front, i.e. viewed, surface of a mosaic type electroluminescent display panel.

The electroluminescent display panel shown in FIG. 1 is comprised of a plurality of individual cells 12. Each cell represents a visual element of the overall image to be displayed. Consequently, the number and size of the cells will be a function of the panel dimensions and image resolution desired. Satisfactory structures with resolutions of better than sixteen lines per inch and a spot size smaller than 0.030 inch square are already feasible.

Figure 2:
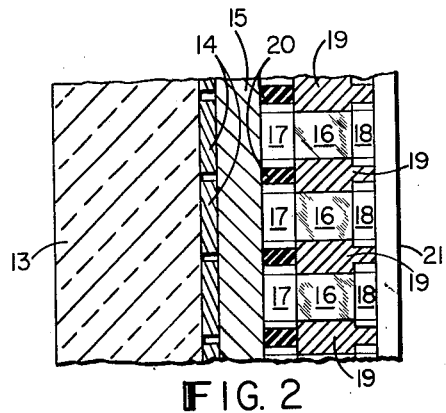
FIG. 2 is a section along the line 2—2 of FIG. 1.

A cross section of the cellular structure is shown in FIG. 2. A base plate or layer 13 of glass, corresponding to the front viewed surface of the panel is covered with a series of separate strips 14 of transparent electrically conductive material such as evaporated aluminum laid down in separate X-coordinate rows; and a layer 15 of electroluminescent material, e.g. zinc sulfide dispersed in a ceramic material such as low melting glass, is disposed over them.

Superposed upon the electroluminescent layer 15 is a cellular structure comprising a plurality of light diffusing glass columns 16, each having electrically conductive front and rear caps, 17 and 18 respectively. These caps are physically separated from each other but electrically connected by a deposit 19 of photoconductive material such as sintered cadmium sulfide.

The front caps 17 are light transparent as well as electrically conductive (e.g. evaporated aluminum) and are isolated from one another by a light attenuating, electrical insulating barrier 20 (e.g. black glass or enamel). The rear caps 18 may also be light transparent, or opaque (to minimize the possibility of triggering adjacent cells), as well as electrically conductive, and are connected in Y-coordinate columns by separate conductors 21. The entire assembly is so arranged that every intersection of an X-coordinate conductor 14 and a Y-coordinate conductor 21 contains a cellular unit comprising: a portion of the electroluminescent layer 15; a glass core unit 16 having front and rear conductive caps 17 and 18; a light attenuator isolating the front cap 17; and a photoconductive connection 19 in optical contact with the glass core and in electrical contact wtih both front and rear caps 17 and 18.

Figure 3:
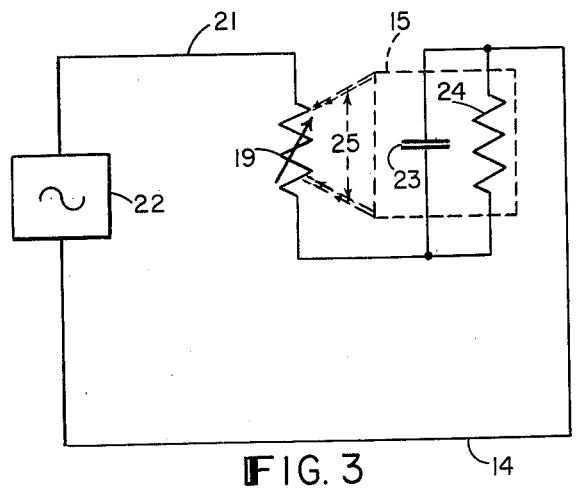
FIG. 3 is a partly schematic diagram of the electrical equivalent of a single cell in the structure of FIGS. 1 and 2.

In the combined electrically schematic and diagrammatic representation of an individual cell shown in FIG. 3, a source 22 of electrical energy is applied to conductors 14 and 21. Conductor 21 is connected, serially, through the photoconductive resistor 19, to the electroluminescent material 15 which has the electrical characteristic of a capacitance 23 shunted by a resistor 24. Light from the electroluminescent material 15, indicated at 25, impinging upon the photoconductor 19 causes it to act as a variable resistor.

In the dark, a voltage signal applied between strips 14 and 21 fails to produce a light image on the face of the electroluminescent layer 15. Once, however, sufficient voltage amplitude is applied across strips 14 and 21 to provide a high enough voltage drop across the resistance 24 of layer 15, a spot of light will appear in the electroluminescent material 15 between one of the conductive strips 14 and the front cap 17 of the particular cell located at the intersection of the strips 14 and 21 which have been excited. This light will radiate outward through the glass face 13 of the display and also be diffused, through the light transparent conductive cap 17 and the glass column 16, to the photoconductive material 19 surrounding the excited cell. The effect of this light upon the photoconductor 19 is to lower its resistance thereby to produce substantially a short circuit between the front cap 17 and the rear cap 18 of the excited cell. In this manner the cell tends to hold itself in excited or lit condition by a feed-back operation.

Figure 4:
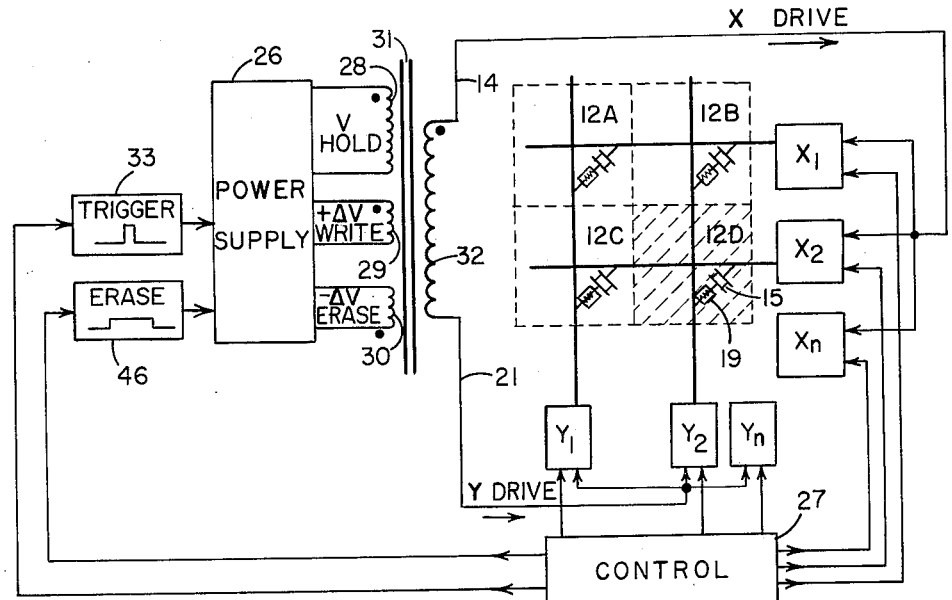
FIG. 4 is a block diagram of an electroluminescent panel display system embodying the invention.
Figure 5:
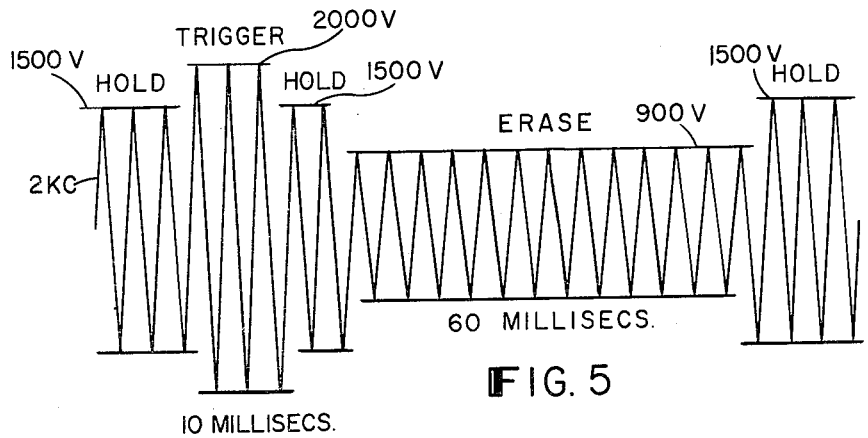
FIG. 5 is a diagrammatic representation of Hold, Triggering, and Erase voltage signals employed in the system of FIG. 4.

FIG. 4 is a diagrammatic representation of four cells, 12A, 12B, 12C, 12D, and their associated driving mechanism; and FIG. 5 shows the wave form of the driving energy as it: writes information into a cell, i.e. illuminates or triggers it; as it erases, i.e. extinguishes a cell; and, as it holds a cell in either lit or extinguished condition.

In general, the circuit of FIG. 4 operates in the following manner to illuminate and extinguish individual cells without disturbing others.

A power supply 26 is arranged to provide, in cooperation with selectively variable impedances in the drive lines, A.C. signals of three different amplitudes, as desired, across the individual cells 12. The intermediate amplitude is identified as a Hold or "bias" voltage. It is of the proper level to hold an already illuminated cell or an extinguished cell in its respective off or on condition. The higher amplitude is identified as a Trigger voltage. When it is applied across the X- and Y-coordinate conductors of a cell, that particular cell illuminates. The lower amplitude is identified as the Erase or quenching voltage. When the voltage applied to the coordinates of an illuminated cell is reduced below this level, that cell extinguishes and remains unlit even when the applied voltage is raised to hold level.

The required variations in voltage are determined by a central control 27 which may be a computer or any suitable programming device. It enables the power supply 26 to provide Hold, Trigger, or Erase pulses in a desired sequence or variety. These pulses are fed to the primary windings 28, 29, and 30 respectively of a transformer 31 which has its secondary winding 32 connected across the conductors 14 and 21 to the X- and Y-coordinate drives respectively of the display panel matrix 11.

The control 27 also selectively adds an impedance load to or subtracts it from the circuit of a particular, or groups of particular, X and Y coordinates to cause desired cells to receive the full effect of a Trigger or Erase pulse while unselected cells are not subjected to sufficient change to alter their state. This is accomplished by appropriate operation of variable impedance switches (see FIG. 6) in the X and Y drive circuits in a manner to be described. The overall effect enables the panel to illuminate; store in prolonged display; or erase; any desired image or variation of an image represented by any patterned combination of cells 12.

In more detail, the system operates to light, extinguish, or hold in a lit or extinguished condition any particular cell, 12D, in the following manner.

Figure 7:
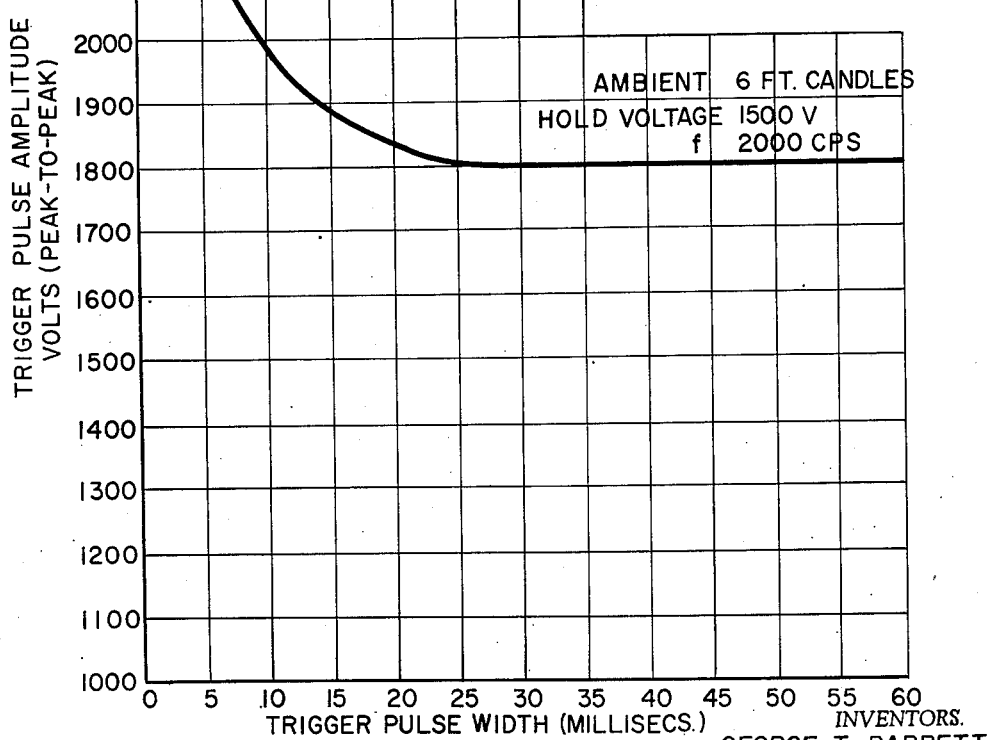
FIG. 7 is a plot of trigger pulse amplitude vs. width for a display panel in the system of FIG. 4.

In this explanation, referring especially to FIGS. 5, 7, and 8, an ambient light of 6-foot candles and a 2 kc. voltage supply are assumed with a Hold voltage of 1500 v., a Trigger voltage of 2000 v. and an Erase voltage of 900 v. The voltages referred to are peak to peak, as measured at the cells, and will vary with materials used, frequency, ambient light, etc.

The significance of the curve plotted in FIG. 7 is its demonstration of the dynamic triggering characteristics of these cells. It shows triggering to be a function not only of voltage amplitude but also of pulse width. Thus, a cell may be triggered by only a 10 millisecond pulse of the order of 2000 v. but will require a pulse duration approximately two-and-one-half times as long to be triggered by a signal of 90 percent of this value, viz. 1800 v. This double requirement of proper pulse width as well as voltage amplitude to effect a change of state makes for reliable operation of cells in a matrix arrangement subject to various transient voltages because, although all of the cells located along a selected coordinate are subjected to a voltage surge during a triggering operation, the rise in voltage will trigger only cells located at the intersection of selected coordinates because only these cells will receive the full cumulative voltage, and the duration of the applied rise in voltage is limited to that required for triggering at maximum signal. This insures that transient surges of less than critical amplitude will not trigger unselected cells.

Similarly, FIG. 8 plots the duration of an erase or quenching pulse against voltage amplitude. Again, the dynamic character of the curve should be noted. These double requirements of critical pulse duration as well as amplitude make it possible to relax somewhat the extremely difficult specification of almost exact uniformity in operating characteristics hitherto required for the individual cells used in this type of display.

Normally, a signal from the hold primary 28 of the power supply 26 applies, through the output winding 32 of transformer 31, a Hold voltage across the X drive conductors 14 and the Y drive conductors 21 of the matrix 11. This voltage will hold each individual cell 12 in either a lit or extinguished condition, depending upon its state when the voltage is applied.

If it is desired to illuminate, for example, cell 12D, the central control 27 applies the proper signal to the trigger pulse generator 33 to provide a control pulse to the supply 26 which will result in a trigger pulse signal to primary winding 29 of transformer 31. This signal is controlled by the pulse from trigger generator 33 to last for the proper trigger duration of the system. Since primary 29 is wound in the same direction as primary 28, the effect of the additional primary pulse at the secondary winding 32 of transformer 31 is to provide a rise in the voltage applied across the X and Y drive lines.

If we consider the Hold voltage as $V$ and the Trigger voltage rise as $\Delta V$, the voltage applied to each of the X and Y coordinate drives will be changed by this operation from $V$ to $V+\Delta V$. Simultaneously, control 27 actuates impedance switches 34 (FIG. 6) in each of the drive lines $X1$–$Xn$ and $Y1$–$Yn$ in a manner to be explained to apply this full triggering voltage across cell 12D and less than the full voltage across the remainder of the cells 12.

Figure 6:
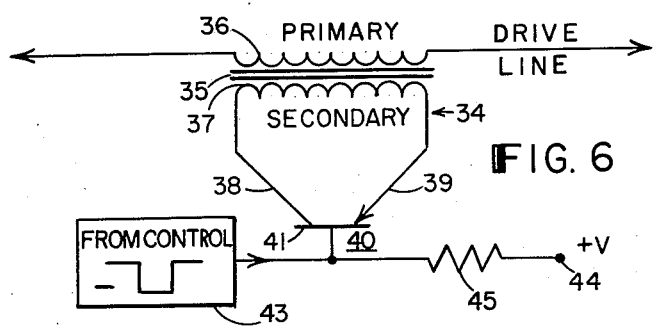
FIG. 6 is a schematic representation of an impedance switch employed in the X- and Y-coordinate drive lines of the system of FIG. 4.

Each of the drives $X1$, etc. and $Y1$, etc., as shown in FIG. 6, include a transformer 35 having a primary winding 36 in series with the drive line and a secondary winding 37 connected across the collector 38 and the emitter 39 of a transistor 40 which has its base 41 connected to a source 43 for a signal control pulse from the central control 27.

The transistor 40 is normally biased to cut off by voltage derived at a terminal 44 and connected, through a biasing resistor 45, to the base 41. With the transistor in cut off condition, there is a maximum impedance between the collector 38 and emitter 39. The result is an effective open circuit reflected back to the primary 36 which causes its inductance to introduce a voltage dropping impedance $X_L$ into the drive line. When a pulse of proper polarity and amplitude is applied from source 43 to the base 41 of transistor 40, the cut off bias is overcome and the transistor conducts in saturation. This is reflected as a short circuit to the primary winding 36 and removes its impedance $X_L$ from the drive line. Thus, transformer 35 acts as a variable impedance operated by pulses from the central control 27, and preforms a switching function with the advantages of supporting a flexible electronic system of selective high speed control and eliminating voltage arcing between mechanical contacts with associated design problems at the voltages concerned When all of the drive lines are performing a hold operation, the voltage V is applied, via primary winding 28 through the transformer 31; and, all of the switches 34 are open, i.e. providing a reactive load at their respective primary windings 36. The result at each cell is a Hold voltage of $V-2V_L$ (where $V_L$ is the voltage drop across transformer 35). This is due to the drop across the primaries 36 in both the X and Y coordinates of each cell 12.

Now, if cell 12D is to be illuminated, the central control 27 applies a pulse to the base 41 of the transistor 40 in the switches 34 associated with drives X2 and Y2 which intersect at cell 12D, as explained above, at the same time the $+\Delta V$ pulse increase is added to the amplitude of the Hold pulse V in transformer 31 to provide a Trigger signal. The control pulses cause the transistors concerned to conduct in saturation and short circuit the transformer 35, thereby eliminating the impedance load from the drive lines X2 and Y2. The result is a full Trigger voltage $V+\Delta V$ across the cell 12D and consequent illumination. Once the cell has been excited in this manner, the feedback of light from the electroluminescent component 15 to the photoconductor 19, as explained above, keeps the cell illuminated, even when the additional voltage of the trigger pulse has been removed and the applied voltage has been returned to the hold level.

While the Trigger voltage $V+\Delta V$ is applied in this manner to cell 12D, cell 12A will have applied across it a voltage of $V+\Delta V-2V_L$ (where, again, $V_L$ is the drop in applied voltage across the impedance L), because the switches 34 associated with its coordinates X1 and Y1 have remained open and each of these lines contributes a loss of $V_L$ to the circuit.

Cells 12B and 12C each have a voltage of $V+\Delta V-V_L$ applied across them because cell 12B, through its co-ordinate conductor X1, and cell 12C, through its coordinate conductor Y1, have a voltage drop across the transformer 35 impedance of open switches 34 reflected in their applied signals while their other coordinates, Y2 and X2 respectively, apply a full signal of $V+\Delta V$ without loss, since their respective switches 34 are closed and there is no impedance drop in their lines.

If we assume $V+\Delta V$ to be the critical triggering amplitude for the duration of the trigger control pulse coming from source 33, it will be appreciated that none of the remaining cells 12A–12C have sufficient voltage applied to trigger them into illumination; and reference to FIG. 7 demonstrates that if the trigger is 2000 v. and lasts for only its critical pulse duration of 10 milliseconds a voltage drop of only 10% across the impedance of transformer 35 will reduce the applied drive voltage to 1800 v. and provide an additional safety factor of 2½ to 1 against triggering undesired cells because even at this slightly reduced voltage an effective Trigger pulse would have to be increased from 10 to 25 milliseconds.

When it is desired to erase the illuminated cell 12D, the central control 27 applies an Erase pulse from a source 46 to the power supply 26. This produces a $-\Delta V$ pulse in the third primary winding 30 of transformer 31. Third primary 30 is wound in opposition to first primary 28. Consequently, its signal bucks the Hold voltage $v$ from primary 28 in transformer 31 and results in an Erase signal of less than Hold voltage being applied across the X and Y drive lines. Simultaneously, the control 27 opens the switches 34 in the coordinate conductors X2 and Y2 which intersects at the cell 12D and closes the switches 34 in the coordinate conductors intersecting at the remainder of the cells 12 where it is not desired to erase.

The result is: an Erase signal of $V-\Delta V-2V_L$ at cell 12D, due to the drop $V_L$ across each of the impedances L; a signal of $V-\Delta V$ at cell 12A, since the switches 34 associated with its coordinate conductors X1 and Y1 have been closed to short circuit their respective voltage dropping impedances; and a signal of $V-\Delta V-V_L$ across cells 12B and 12C, since these two cells have the transformer 35 impedance of one of their coordinates short circuited and the other still in circuit.

In this manner, the invention provides for selectively controlling the voltage applied across individual cells 12 in the matrix 11 by varying both the amplitude of the signal from the power supply output transformer 31 and the impedance load of selected X- and Y-coordinate drive lines to thereby raise or lower the voltage across selected cells and illuminate or extinguish them while the remainder of the cells maintain undisturbed their respective lit or extinguished states. Also, the frequency of the output of power supply 26 may be varied by conventional frequency shifting techniques as a substitution for, or to aid, the variation in amplitude of the applied signal. In this type of operation raising the frequency abets illumination, and lowering it aids the extinguishing process.

It is to be realized that the specific materials, voltages, etc. referred to in this description of one embodiment of the invention are for illustrative purposes only. Alterations and substitutions may be made to produce other desired effects, and to comply with changes in factors such as intensity of ambient light, frequency of the power supply, etc. Also, other applications, features, embodiments, and modifications will be evident from the foregoing description against the background of the "Sylvatron" article referred to, the references cited in that article, and the general state of the art.

What is claimed is:

1. A visual display system which comprises: a display panel having a plurality of image cells arranged in X-coordinate rows and Y-coordinate columns, each cell comprising an area of electroluminescent material, a first and a second electrical contact on either side of said material, said first contacts of all the cells in each X-coordinate row being connected to each other and insulated from the similar contacts of the other rows, and said second contacts of all the cells in each Y-coordinate column being similarly connected to each other and insulated from the similar contacts of the other columns; means for providing relatively high amplitude trigger voltage signals, relatively low amplitude erase voltage signals, and intermediate amplitude hold voltage signals, said means including a transformer having a secondary winding connected to said electrical contacts a first primary winding connected to a source of hold signals and second and third oppositely wound primary windings connected respectively to a source of trigger and a source of erase signals; and, means for selectively applying the potential developed in said secondary winding across any combination of said X- and Y-coordinate rows.

2. The invention according to claim 1 wherein said trigger and erase signals differ in pulse duration as well as amplitude.

3. A visual display system which comprises: a display panel having a plurality of image cells arranged in X-coordinate rows and Y-coordinate columns, each cell comprising an area of electroluminescent material, a first and a second light transparent electrical conductor on either side of said material, a light diffusing element in contact with said second conductor, a rear electrical contact proximate said light diffusing element, a photoconductive connector in optical contact with said light diffusing element and in electrical contact between said second light transparent conductor and said rear electrical contact; a first plurality of coordinate conductors connecting the first light transparent electrical conductors of all the cells in each X-coordinate row to each other; a second plurality of coordinate conductors connecting the rear electrical contacts of all the cells in each Y-coordinate column to each other; means for providing relatively high amplitude trigger voltage signals, relatively low amplitude erase voltage signals, and intermediate amplitude hold voltage signals; and, means for selectively applying any desired one of these voltages across any combination of said X- and Y-coordinate rows.

4. The invention according to claim 3 and wherein said trigger and erase signals differ in duration as well as amplitude.

5. A visual display system which comprises: a display panel having a plurality of electroluminescent-photoconductive visual elements arranged in X-coordinate rows and Y-coordinate columns, and comprising an area of electroluminescent material having light transparent front and rear electrically conductive surface covers, a light diffusing member proximate said rear surface cover, a rear contact proximate said light diffusing member, a photoconductive connector in optical contact with said light diffusing member and electrical contact between said rear surface cover and said rear contact; a plurality of X-coordinate conductors separately interconnecting the front surface covers of all the visual elements of each X-coordinate row; a plurality of Y-coordinate conductors separately interconnecting the rear contacts of all the visual elements of each Y-coordinate column; a power supply providing relatively high amplitude trigger voltage signals, relatively low amplitude, erase voltage signals, and intermediate amplitude hold voltage signals; a separate X or Y drive circuit connected respectively to each of said X- or Y-coordinate conductors; a variable impedance switch in each of said drive circuits; means for selectively applying said hold, trigger, or erase voltage signals to said drive circuits as desired; and, means for selectively operating said variable impedance switches to control the amplitude of the voltage signals of said drive circuits.

6. The invention according to claim 5 wherein said trigger and erase voltage signals each comprise voltage pulses, and said erase pulses are of relatively longer duration than said trigger pulses.

7. The invention according to claim 5 wherein said means for selectively applying hold, trigger, and erase signals to said drive circuits comprises a transformer having: a secondary winding connected to said drive circuits; a first primary winding connected to a source of hold signals; a second primary winding connected to a source of trigger signals; a third primary winding connected to a source of erase signals; and, said first and second primary windings are wound in the same direction while said third primary winding is wound in opposition to said first and second windings.

8. An electroluminescent device comprising: a plurality of X-coordinate and Y-coordinate electrical conductors arranged to intersect in a cross-grid matrix; a plurality of elemental areas of electroluminescent material each located in electrical contact between one of said X-coordinate and one of said Y-coordinate conductors at an intersection of said matrix, said electroluminescent elemental areas each having a bistable characteristic in that it will illuminate in response to signals of a first amplitude, extinguish if said signals are decreased below a second amplitude, and remain in either illuminated or extinguished condition, respectively, in response to signals of an intermediate amplitude after being first subjected to signals of said first or second amplitude; means for providing trigger signals of said first amplitude, erase signals of said second amplitude and hold signals of said third amplitude; and, means for selectively applying said trigger, erase and hold signals across the electroluminescent elemental area between any desired intersection of an X-coordinate and a Y-coordinate conductor.

References Cited in the file of this patent

UNITED STATES PATENTS

| | | |
|---|---|---|
| 2,743,430 | Schultz et al. | Apr. 24, 1956 |
| 2,774,813 | Livingston | Dec. 18, 1956 |
| 2,823,321 | Sims | Feb. 11, 1958 |
| 2,834,005 | Ketchledge | May 6, 1958 |
| 2,838,686 | Eckert | June 10, 1958 |
| 2,859,385 | Bentley | Nov. 4, 1958 |